United States Patent [19]

Sherman

[11] 4,056,930

[45] Nov. 8, 1977

[54] INTERNAL COMBUSTION TURBINE

[76] Inventor: Henry B. Sherman, 935 West St., Cleveland, Ohio 44113

[21] Appl. No.: 675,576

[22] Filed: Apr. 9, 1976

[51] Int. Cl.² .............................................. F02G 3/00
[52] U.S. Cl. ...................................... 60/39.78; 60/624
[58] Field of Search ...................... 60/597, 624, 39.78, 60/617, 619, 39.75; 123/44 D, 44 E

[56] References Cited

U.S. PATENT DOCUMENTS

| 845,622 | 2/1907 | DuShane | 60/617 |
|---|---|---|---|
| 1,277,626 | 9/1918 | Milke | 60/39.75 |
| 1,279,128 | 9/1918 | Lake | 60/624 |
| 1,339,483 | 5/1920 | Simpson | 60/624 |
| 2,109,185 | 2/1938 | Thompson | 123/44 D |
| 2,276,772 | 3/1942 | Heap | 60/624 |
| 2,336,786 | 12/1943 | Gunst | 60/624 |
| 3,442,077 | 5/1969 | Youhouse | 60/619 |
| 3,730,148 | 5/1973 | Babgy | 123/44 D |

Primary Examiner—Carlton R. Croyle
Assistant Examiner—Louis J. Casaregola

[57] ABSTRACT

An engine includes a rotatable cylinder block having a plurality of cylinders reciprocally receiving pistons. A combustible mixture ignited successively in each cylinder is discharged for expansion through an exhaust port in a stationary member associated with the rotatable block. The expanding gases are directed against a rotatable turbine wheel and rotatably drive same.

6 Claims, 3 Drawing Figures

INTERNAL COMBUSTION TURBINE

BACKGROUND OF THE INVENTION

This application relates to the art of engines, and more particularly to an internal combustion engine associated with a turbine wheel for using the expanding gases resulting from combustion in the engine for rotatably driving the turbine wheel.

It is known to associate an engine with a turbine wheel which is driven by gases ignited in the engine. These structures have been cumbersome and complex. An example of such structure is disclosed in U.S. Pat. No. 1,062,308, issued May 20, 1913 to Thummel. The Thummel arrangement requires connecting rods, poppet valves, and wrist pins, so it is subject to considerable wear. Nichols U.S. Pat. No. 1,405,551, issued Feb. 7, 1922, and Benoit U.S. Pat. No. 3,068,639, issued Dec. 18, 1962, disclose internal combustion turbines wherein pistons simply reciprocate back and forth in a block. These arrangements also require valves for each cylinder, along with separate spark plugs for ignition.

Millar U.S. Pat. No. 847,489, issued Mar. 19, 1907, and Rinker U.S. Pat. No. 3,710,569, issued Jan. 16, 1973, disclose internal combustion engines wherein the cylinders and pistons rotate. Millar does not contemplate driving a rotatable turbine wheel with exhaust gases from his engine, and uses pivoted followers which are somewhat similar to connecting rods and wrist pins for reciprocating the pistons. Rinker has independent exhaust ports from each cylinder, and the exhaust ports are rotated with the cylinders. The exhaust ports are directed against a stationary turbine wheel so that rotation is imparted to the cylinders by exhaust gases impinging against the stationary turbine wheel. The Rinker arrangement requires separate spark plugs for each cylinder, along with separate intake valves.

Patents of general interest for other rotary engines include Fleming U.S. Pat. No. 734,226, issued July 21, 1903; Ragot U.S. Pat. No. 1,321,146, issued Nov. 11, 1919; and Eickmann U.S. Pat. No. 3,223,046, issued Dec. 14, 1965. Fleming discloses a steam engine wherein steam is alternately supplied between two pistons and then to the opposite sides of the pistons for reciprocating same. Eickmann relates to a radial hydraulic pump or the like.

It would be desirable to have an economical, practical internal combustion engine and turbine combination which requires no connecting rods, poppet valves or wrist pins, and wherein ignited gases within the engine cylinders are discharged for expansion to drive a turbine wheel, as opposed to the gases being used for a power stroke of a piston.

SUMMARY OF THE INVENTION

A cylinder block mounted for rotation about a block axis includes at least one cylinder reciprocally receiving a piston and having a cylinder axis extending substantially perpendicular to the block axis. The cylinder travels in a circular predetermined path in a predetermined direction during rotation of the block about its axis. Stationary means associated with the block includes piston-reciprocating means for reciprocating the piston in successive compression and expansion strokes during rotation of the block relative to the stationary means. The stationary means includes supply means for supplying combustible fuel to the cylinder. Igniting means is provided for igniting the fuel in the cylinder adjacent the end of one of the piston compression strokes at a predetermined ignition point in the circular path in which the cylinder travels. The stationary means includes exhaust port means located closely adjacent the predetermined ignition point and spaced slightly therefrom in the predetermined directon so that a substantial volume of expanding gases in the cylinder expand outwardly therefrom through the exhaust port means, rather than expanding in the cylinder during one of the expansion strokes of the piston following ignition of the fuel.

The igniting means for igniting the fuel in the cylinder is preferably a spark plug mounted in the stationary means and connected with an ignition distributor attached to the shaft on which the block is rotatably mounted. However, it will be appreciated that certain aspects of the invention can be used with a compression ignition engine instead of a spark ignition engine. With a compression ignition engine, a glow plug or other starting arrangement could be used for initiating combustion. Therefore, in its broadest aspects, reference to igniting means is intended to cover either spark ignition or compression ignition.

Vaporizable liquid supply means is connected for supplying vaporizable liquid to the exhaust port means wherein the liquid is vaporized for increasing the mass of the gases striking against the rotatable turbine wheel. The exhaust port means may include a venturi so that the vaporizable liquid is aspirated into the venturi by the flow of exhaust gases therethrough from combustion in the cylinders. The vaporizable liquid may be a supplemental combustible fuel which is ignited by the hot exhaust gases so that the volume of expanding gases striking the rotatable turbine wheel for driving same is substantially increased. When the vaporizable liquid or supplemental fuel is aspirated, its supply rate is generally proportional to the flow rate of exhaust gases from the engine through the venturi.

Mechanical drive means may be provided for drivingly interconnecting the rotatable cylinder block and the rotatable turbine wheel.

The stationary means associated with the rotatable cylinder block includes air intake and scavenging ports sequentially spaced in the predetermined direction from the exhaust port means for supplying air to the cylinder during an expansion stroke of the piston after movement of the cylinder past the exhaust port means, and for exhausting air from the cylinder during a compression stroke of the piston. This ensures substantially complete purging of the cylinder after each ignition.

It is a principal object of the present invention to provide an improved internal combustion engine and turbine combination of a simple practical construction and having a minimum number of moving parts.

It is an additional object of the invention to provide an internal combustion turbine with means for increasing the mass of exhaust gases impinging against the rotatable turbine wheel.

DESCRIPTION OF A PREFERRED EMBODIMENT

Figure 1:
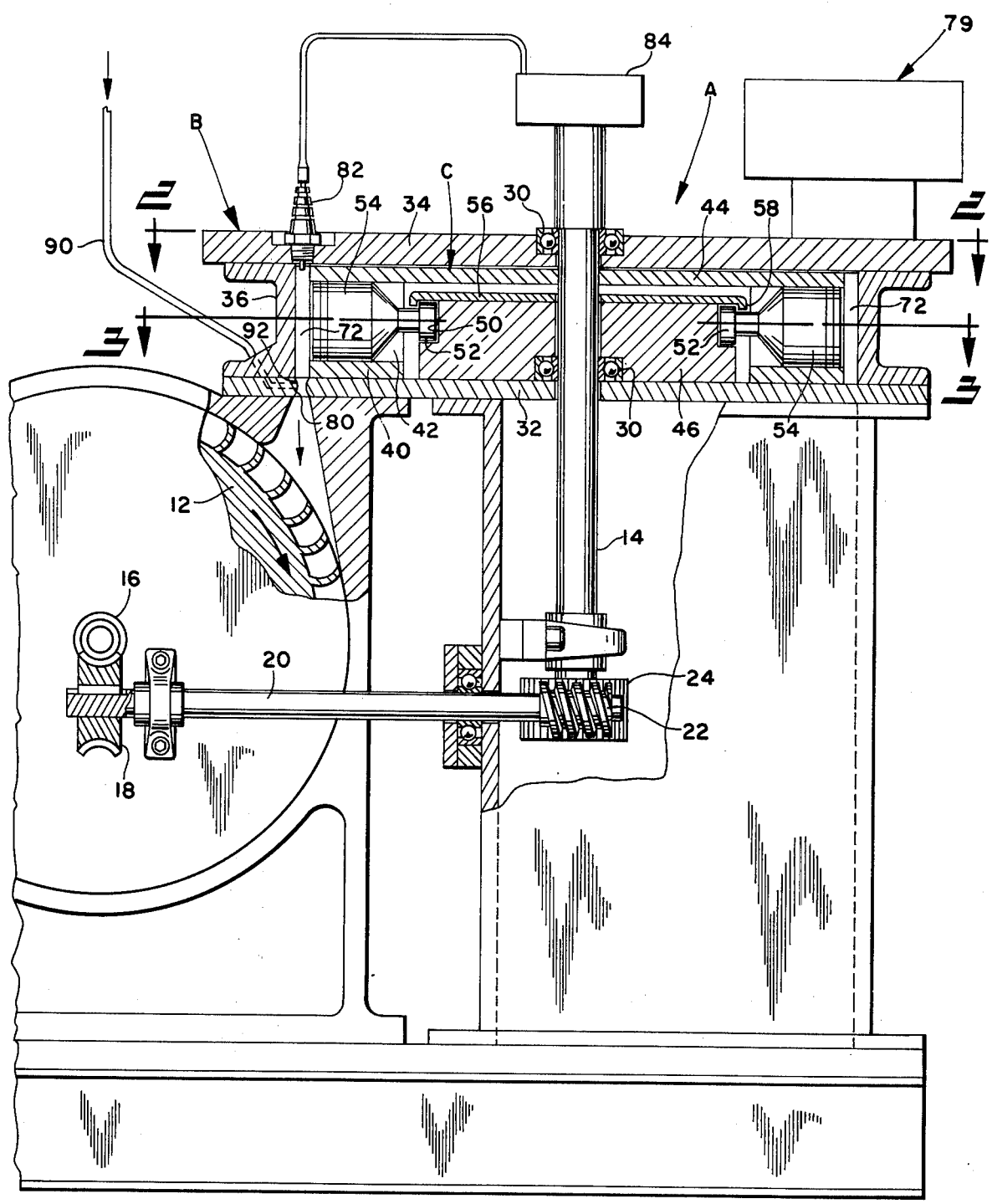
FIG. 1 is a schematic elevational view of an apparatus embodying the present invention with portions in section for clarity of illustration.

With reference to the drawings, FIG. 1 shows an internal combustion engine A arranged for directing exhaust gases against a rotatably mounted turbine wheel 12. The engine A has a rotatably mounted shaft 14 whose axis extends substantially perpendicular to the rotational axis of the turbine wheel 12. Mechanical drive means is provided for drivingly connecting the engine A and the wheel 12, and this may include a worm gear 16 on the shaft of the wheel 12 drivingly engaging worm wheel 18 on a shaft 20 having another worm gear 22 drivingly engaging worm wheel 24 on the engine shaft 14. The shaft 20 is rotatably mounted in any suitable manner to the frame or supports on which the engine A and the wheel 12 are mounted.

The engine shaft 14 is rotatably mounted in suitable bearings 30 and extends through stationary means B which includes a bottom plate 32, a top plate 34, and a peripheral plate 36 which may be integral with the bottom plate 32. The plates 32, 34 and 36 are suitably bolted or otherwise secured together to define the stationary means which is in the form of a generally hollow circular housing.

A generally circular cylinder block C is positioned within the stationary means or housing B, and includes an enlarged peripheral portion 40 having a plurality of generally radially extending cylinders 42, equidistantly spaced circumferentially therearound. The block C is hollowed out in its central portion inwardly of the cylinders 42 and has a continuous top portion 44 which is keyed or otherwise suitably drivingly connected with the shaft 14 for rotation therewith relative to the stationary means B.

A guide path member 46 is bolted or otherwise suitably secured to the bottom plate 32, and extends upwardly into the hollow central portion of the block C. The guide path member 46 has a generally elliptical guide path 50 receiving followers 52 on cylindrical pistons 54 reciprocally received in the cylinders 42. A retaining member 56 is bolted or otherwise secured to the top of the guide path member 46 and has an elliptical downwardly extending flange 58 for retaining the piston followers 52 within the guide path 50.

Each cylinder 42 has a generally radially extending cylinder axis, and all of the cylinder axes intersect at a common point which corresponds to the rotational axis of the engine shaft 14 and the block C, as well as corresponding to the center of the circle about which the block C is formed. The longitudinal axes for the cylinders 42 lie in a common plane, and the shaft 14 extends perpendicularly to that plane. The axis of the shaft 14, block C and the intersection point of the cylinder axes is represented by numeral 62 in FIG. 3.

Figure 2:
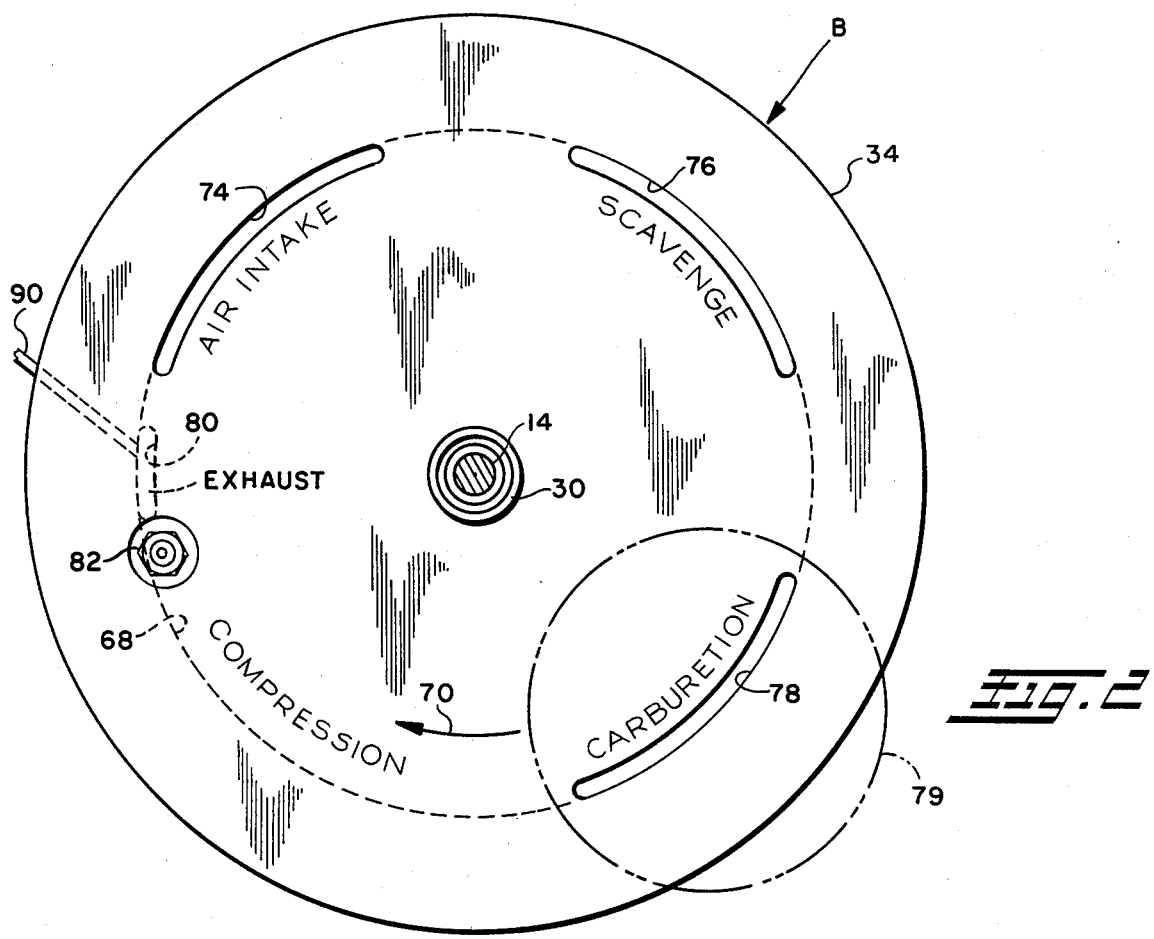
FIG. 2 is a cross-sectional plan view, taken generally on line 2—2 of FIG. 1.

The inner peripheral surface of the cylindrical hollow interior of the stationary means or housing B is generally indicated by numeral 68, FIG. 2. The circular outer periphery of the cylinder block C fits closely adjacent the peripheral surface 68. The cylinder block C rotates relative to the stationary means B in the direction of the arrow 70 for moving the cylinders 42 of FIGS. 1 and 3 in a circular path. The cylinders 42 are open at their outer ends, and the outer periphery of the block C is recessed inwardly in line with each cylinder 42, as shown generally by numeral 72, so that each cylinder 42 is open radially as well as axially with respect to the outer periphery of the block C. Sequential holes through the top plate 34 of FIG. 2 define an air intake port 74, a scavenging or air exhaust port 76, and a fuel and air intake port 78 to which a combustible mixture is supplied as by a carburation device 79.

Exhaust port means 80 is formed through the bottom plate 32 of the stationary means B. Numeral 82 represents a spark plug suitably connected to an ignition distributor 84 mounted on the engine shaft 14 of FIG. 1 so that the plug 82 sparks at predetermined points in the rotational cycle of the block C. The predetermined ignition point for the combustible mixture in each cylinder is slightly ahead of the exhaust port means 80. Following rotation of the block C past the opening 78 so that each cylinder receives fuel and air during an expansion stroke of its piston, the piston goes through a compression stroke until that cylinder reaches spark plug 82 when the piston is adjacent the end of its compression stroke, or about to begin its expansion stroke. The plug 82 then sparks to ignite the combustible mixture in the cylinder. The exhaust port means 80 is located closely adjacent the ignition point in the circular path of each cylinder, and is spaced only slightly therefrom in the predetermined direction of rotation of the block C. Therefore, immediately after the spark has ignited the combustible mixture in each cylinder, the expanding combusted gases are exhausted through the exhaust port means 80 for expansion outwardly therethrough instead of expanding within each cylinder during an expansion stroke of the piston. A substantial portion of the combusted gases expand and are exhausted through the exhaust portion means 80 instead of being used for a power stroke of the piston. During the major portion of the following expansion stroke of the piston, purge air is taken into the cylinder through the air inlet port 74. This purge air is then exhausted through the exhaust port 76. The cycle repeats for each successive cylinder and piston. Each piston reciprocates in its corresponding cylinder, and goes through two compression strokes and two expansion strokes during each revolution of the cylinder block C.

Figure 3:
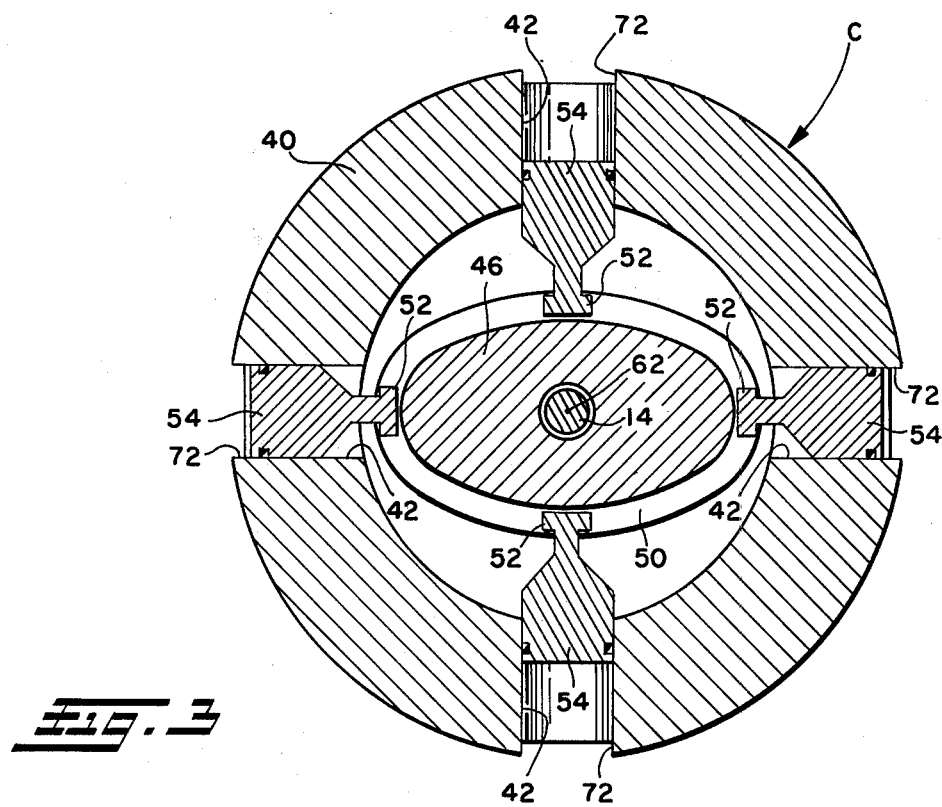
FIG. 3 is a cross-sectional plan view, taken generally on line 3—3 of FIG. 1.

The elliptical path 50 of FIG. 3 is arranged for moving the pistons 54 in their compression and expansion strokes during rotation of the block C. The pistons start a compression stroke when moving from the minor axis of the elliptical path toward the major axis of such path, and start an expansion stroke when moving from the major axis toward the minor axis. The guide path 50 is located inwardly of the cylinders 42 and outwardly of the shaft 14. This simplified arrangement eliminates the need for pivoted connecting rods or the like, and makes it possible to construct a very compact apparatus which occupies a relatively small volume.

The expanding hot gases from each cylinder expand and travel at high velocity through exhaust port means 80 against the rotatable turbine wheel 12 for rotatably driving same. In order to increase the mass of the gases striking the turbine wheel 12, a vaporizable liquid supply conduit 90 connected with a suitable liquid supply may have an outlet 92 positioned within a portion of the exhaust port means 80 which is shaped somewhat like a venturi. The flow of hot expanding gases through the exhaust port means 80 will then aspirate the vaporizable liquid through the outlet 92 of the conduit 90 for vaporization to increase the mass of gases striking against the wheel 12. In one arrangement, supplemental combustible fuel and air may be aspirated or otherwise fed through the conduit 90 and outlet 92 into the exhaust port means 80 for combustion and mixture with the exhaust gases flowing through the exhaust port means from the engine. This increases the volume and velocity of gases striking the turbine wheel 12 for rotatably driving same. Other liquids including water can be supplied through the conduit 90. Water would flash into steam in the hot exhaust gases and increase the mass of the gases drivingly striking the wheel 12.

The combustible mixture ignited within the engine 80 has substantially all of its energy directed against the turbine wheel 12 instead of being utilized for a power stroke of a piston or moving the piston in an expansion stroke. Obviously, any suitable starter may be provided for initially rotating the turbine wheel to start the engine. Where the turbine wheel and the engine are not drivingly connected, or are drivingly connected by a drive other than worm gears or worm wheels, the engine shaft 14 itself may be rotatably driven by a suitable starter for starting same. Obviously, suitable seals may be provided between various rotating parts, if so desired. For example, axially extending seals may be provided on the outer periphery of the block C on opposite sides of each of the cylinders 42 for engaging the inner peripheral surface 68 of the cavity in the stationary means B. Likewise, suitable radially extending seals may be provided on the block C, or on the undersurface of the top plate 34 between each port. It will be recognized that the guide path 50 defines a piston-reciprocating means on the stationary means B for reciprocating the pistons as the block rotates. The stationary means B is associated with the rotatable block C for providing the various intake and exhaust ports, with the same ports being used for each successive cylinder during rotation of the block C. Likewise, only a single spark plug need be provided when spark ignition is utilized.

Instead of using the carburation device 79 for supplying a combustible mixture of fuel and air to each successive cylinder, other fuel supply means, such as fuel injection, could be used so that only air would be supplied to each cylinder through the port 78 and another fuel port in the stationary means B would be used for injecting fuel into the cylinder during the compression stroke of the piston, or adjacent the ignition point in the circular path. The separate air and fuel ports would still define the combustible mixture supply means.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

Having described my invention, I claim:

1. Apparatus comprising a cylinder block mounted for rotation about a block axis, means for rotating said cylinder block about said block axis, said cylinder block including at least one cylinder reciprocally receiving a piston and having a cylinder axis extending substantially perpendicular to said block axis so that said cylinder travels in a circular predetermined path in a predetermined direction during rotation of said block about said block axis, stationary means associated with said block and including a stationary piston-reciprotating cam means for reciprocating said piston in successive compression and expansion strokes during rotation of said block relative to said cam means, said stationary means including supply means for supplying combustible fuel to said cylinder, igniting means for igniting said fuel in said cylinder adjacent the end of one of said compression strokes at a predetermined ignition point in said path and when said piston has been moved to a predetermined position in said cylinder by said stationary cam means, said stationary cam means having a surface portion in engagement with said piston for maintaining said piston in said predetermined position during igniting of said fuel, and said stationary means including exhaust port means located closely adjacent said predetermined ignition point and spaced slightly therefrom in said predetermined direction so that a substantial volume of expanding gases in said cylinder expand outwardly therefrom through said exhaust port means rather than moving the piston toward the axis of block rotation, and a rotatable turbine wheel positioned for being rotatably driven by gases flowing through said exhaust port means.

2. The apparatus as defined in claim 1 wherein said means for rotating said cylinder block comprises a mechanical drive arrangement including a drive shaft extending through the center of said stationary cam means and rotating relative thereto and which is drivingly connected to said cylinder block, and a drive mechanism between said turbine wheel for said drive shaft for driving said drive shaft from said turbine wheel.

3. The apparatus as defined in claim 2 further including an ignition distributor for controlling ignition of said igniting means and which is driven from said drive shaft.

4. The apparatus of claims 1 wherein said exhaust port means has a narrow neck area and a vaporizable liquid supply outlet port in said area for enabling aspiration of vaporizable liquid into said exhaust by action of gases flowing through said exhaust port means so that the mass of gases impinging against said wheel is increased.

5. The apparatus of claim 1 including air intake, scavenging and carburation ports sequentially spaced in said predetermined direction from said exhaust port means for supplying air to said cylinder during an expansion stroke of said piston after movement of said cylinder past said exhaust port means and for exhausting air from said cylinder during a compression stroke of said piston.

6. Apparatus comprising a cylinder block having a plurality of cylinders circumferentially spaced equidistantly in a circular path, said cylinders having cylinder axes lying in a common plane and intersecting one another at an intersection point coinciding with the center of the circle on which said cylinders lie, said cylinder block being rotatable for moving said cylinders in a circular path in a predetermined direction about a block axis extending perpendicular to said plane and passing through said intersection point, means for rotating said cylinder block about said block axis, pistons reciprocally received in said cylinders, stationary means associated with said block and including a stationary cam means positioned between said block axis and said cylinders, said pistons having followers positioned for following said cam means, said cam means having elliptical-shaped surface means for moving each said piston through two expansion and two compression strokes during each revolution of said cylinder block, said stationary means including sequentially-spaced purge air supply port means, purge air exhaust port means, combustion air and fuel supply port means, and exhaust port means, igniting means for igniting a combustible mixture in each said cylinder adjacent the end of a compression stroke of each said piston at a predetermined ignition point in said circular path and when said piston has been moved to a predetermined position in said cylinder by said stationary cam means, said stationary cam means having a surface portion in engagement with said piston for maintaining said piston in said predetermined position during igniting of said fuel, and said exhaust port means being located closely adjacent said ignition point and spaced slightly therefrom so that a substantial volume of ignited gases expand outwardly from said cylinders through said exhaust port means instead of driving the piston toward the axis of block rotation, and a rotatable turbine wheel positioned for being rotatably driven by gases passing through said exhaust port means.

* * * * *